(12) United States Patent
Mastro

(10) Patent No.: US 6,745,351 B1
(45) Date of Patent: Jun. 1, 2004

(54) INDEXING SYSTEM FOR PROTOCOL ANALYZERS

(75) Inventor: Jeff Mastro, Anoka, MN (US)

(73) Assignee: I-Tech Corporation, Eden Prairie, MN (US)

( * ) Notice: Subject to any disclaimer, the term of this patent is extended or adjusted under 35 U.S.C. 154(b) by 0 days.

(21) Appl. No.: 09/579,936

(22) Filed: May 26, 2000

(51) Int. Cl.⁷ .................................................. G06F 11/00
(52) U.S. Cl. ........................ 714/57; 714/48; 709/224; 345/440
(58) Field of Search ............................ 714/29, 57, 47, 714/48, 712; 395/184.01; 345/440

(56) References Cited

U.S. PATENT DOCUMENTS

| | | | |
|---|---|---|---|
| 4,949,252 A | | 8/1990 | Hauge |
| 5,339,366 A | * | 8/1994 | Tanaka et al. ............... 382/316 |
| 5,371,842 A | | 12/1994 | Easton et al. |
| 5,434,845 A | | 7/1995 | Miller |
| 5,442,740 A | * | 8/1995 | Parikh ......................... 345/440 |
| 5,450,371 A | * | 9/1995 | MacKay ...................... 367/63 |
| 5,485,564 A | | 1/1996 | Miura |
| 5,649,085 A | | 7/1997 | Lehr |
| 5,737,520 A | * | 4/1998 | Gronlund et al. ............. 714/39 |
| 5,740,355 A | | 4/1998 | Watanabe et al. |
| 5,748,881 A | * | 5/1998 | Lewis et al. .................. 714/47 |
| 5,850,388 A | | 12/1998 | Anderson et al. |
| 5,874,950 A | | 2/1999 | Broussard et al. |
| 5,917,499 A | | 6/1999 | Jancke et al. |
| 6,057,839 A | | 5/2000 | Advani et al. |
| 6,507,923 B1 | * | 1/2003 | Wall et al. ................... 714/712 |
| 6,526,044 B1 | * | 2/2003 | Cookmeyer et al. ......... 370/352 |

OTHER PUBLICATIONS

Wavetek Wandel Goltermann website printout, "Domino Hardware Analyzers (Technical)", Undated.
Digitech Network Protocol Analyzers, "LAN900 Local Area Network Protocol Analyzers", Apr. 2000.
Digitech Network Protocol Analyzers, "RAS Loca Area Network Remote Analysis System", Apr. 2000.
Adtech website printout, "The Adtech AX/4000 Broadband Test System", Undated.
I-Tech Corp., "Fact Sheet, IFC-20 Fibre Channel Analyzer", Aug. 1998.
Finisar, "GLA-3100 Gigabit Link Analyzer for Fibre Channel", Undated.
Ancott Corporation, "FCAccess™ 1000 Fibre Channel Analyzer", Undated.

* cited by examiner

Primary Examiner—Robert Beausoliel
Assistant Examiner—Michael Maskulinski
(74) Attorney, Agent, or Firm—Patterson, Thuente, Skaar & Christensen, P.A.

(57) ABSTRACT

An indexing system provides a more efficient and effective interface to display and manipulate large amounts of trace data from computer data and storage networks that is captured and stored in the trace memory of a protocol analyzer. An index of the trace data in the trace memory is generated by reading a selected granularity percentage of the trace data in the trace memory. A host processor connected to the protocol analyzer generates at least two graphic representations on a computer display device of the trace data in response to and based on the index. A first graphic representation is generated by setting the selected granularity percentage at a first percentage and a second graphic representation similar to the first graphic representation generated while the first graphic representation is being displayed by setting the selected percentage at a second percentage that is greater than the first percentage to regenerate the index. In this way, the first graphic representation is generated in near real time and the second graphic representation is generated at a later time and improves the granularity of the second graphic representation as compared to the first graphic representation. Preferably, the graphic representation is a histogram representative of activity levels within the trace data. A method and computer-readable storage medium containing programming instructions for the indexing system are also disclosed.

20 Claims, 4 Drawing Sheets

INDEXING SYSTEM FOR PROTOCOL ANALYZERS

RELATED APPLICATIONS

The present invention claims priority to a provisional application entitled Indexer and User Interface For Fibre Channel Analyzers, filed May 5, 2000, Ser. No. 60/202,327. The present invention is also related to two patent applications, the first of which is entitled Deep Trace Memory System For A Protocol Analyzer, filed Nov. 17, 1998, Ser. No. 09/193,779, and the second of which is entitled Integrated Multi-Channel Fiber Channel Analyzer, filed Apr. 19, 1999, Ser. No. 09/193,779.

FIELD OF THE INVENTION

The present invention relates generally to the field of diagnostic equipment for computer networks. More specifically, the present invention relates to an indexing system for protocol analyzers that provides a more efficient and effective interface to display and manipulate large amounts of trace data from computer data and storage networks.

BACKGROUND OF THE INVENTION

As the capacity and complexity of computer networks continues to increase, there is an ever-increasing need for diagnostic equipment that can efficiently monitor and diagnose problems with these networks. In a computer network, data is communicated across the network according to a particular interface language or "protocol." A protocol analyzer is a diagnostic device that can be connected to a computer network in order to record or "trace" data communicated across that network in an effort to capture information about performance and/or potential problems on the network.

The requirements and capacity of a protocol analyzer will depend upon the protocol and configuration of the network to which it is to be attached. In computer networks, protocol analyzers traditionally have been designed for a given communication interface protocol that will be used either in a computer data network involving communications among computer systems (these networks transmitted relatively smaller amounts of data sent over longer distances at relatively slower speeds), or in a storage channel network involving communications between a computer and an associated storage system (these networks transmitted relatively larger amounts of data sent over shorter distances at relatively faster speeds). Examples of protocol analyzers for computer data networks include the Domino™ analyzer from Wavetek, Wandel & Goltermann that is the subject of U.S. Pat. No. 5,850,388, the LAN900 expert protocol analyzer from Digitech and the AX/4000 broadband test system from Adtech. Generally, protocol analyzers for computer data networks have been more concerned with capturing statistical trend and occurrence information as, for example, described in U.S. Pat. Nos. 5,434,845 and 5,740,355. Examples of protocol analyzers for storage channel networks include the IFC-20 Fibre Channel analyzer from I-TECH Corp., the assignee of the present invention, the FCAccess analyzer from Ancot and the GT and GLA analyzers from Finisar. Protocol analyzers for storage channel networks are more often concerned with capturing actual trace data information as, for example, described in U.S. Pat. Nos. 4,949,252 and 5,649,085.

With the advent of higher speed network protocols such as Fibre Channel for storage channel networks and Gigbit Ethernet and ATM/OC3 for computer data networks, the amount of information that must be monitored by a protocol analyzer has increased dramatically. For the capture of statistical trend and occurrence information, this increase has not affected the performance of the protocol analyzers because the only operational limitation is the speed at which trend and occurrence information can be collected in counters or the like. More complicated analysis of these networks is usually done in the form of reports that are generated after the fact and not in real time. For the capture and analysis of trace data, however, the increase in network speed has had a significant impact on the performance of protocol analyzers. Prior to the advent of these high speed network protocols, the amount of high speed memory required by a protocol analyzer to capture data for a trace rarely exceeded 1 Mbyte. Downloading and analysis of this amount of trace data was easily handled by the processor systems that would then display this information such that access to the information was usually in near real time. Delays of more than a second to view the results of traces were rare. With higher speed computer networks, it is not uncommon for the amount of trace data being captured to be larger than 100 Mbytes and even up to 1 Gbyte or more. Moreover, with more complex networks, it is also typical that such trace data will be collected simultaneously from a number of channels, rather than only from a single channel, thereby further increasing the amount of trace data that must be analyzed. It is also common for there to be large segments of time in which relatively little data of interest is being communicated across the computer network, as well as small segments of time in which very large amounts of data are being communicated across the computer network. The result has been either lengthy delays from several seconds to several minutes in order to view trace data of interest or the need to severely limit the total trace depth of the protocol analyzer when the analysis and presentation of trace information needs to be done on more of a near real time basis.

One solution to this problem is to provide a hardware search engine for the protocol analyzer that can avoid the need to download the entire trace data file from the protocol analyzer to a user's computer in order to locate specific patterns in the trace data. Such a hardware search engine is the subject of the previously referenced co-pending application entitled Deep Trace Memory System For A Protocol Analyzer. While the use of a hardware search engine can work well to identify particular patterns in the trace data, it has not afforded a solution to the challenge presented when overall statistics are desired such as a histograms or graphs of activity or incident levels across the entire range of trace data.

Various innovations have been made with respect to the graphic display of data outside the field of protocol analyzers and computer networks. U.S. Pat. No. 5,917,499 describes the display of at least two superimposed levels of detail for an element on a graph in response to a user input. U.S. Pat. No. 5,485,564 describes forming a graphical display of data in which a range of value along one of the axis of the graph is omitted. U.S. Pat. No. 5,874,950 describes a technique for creating a set of samples of digitized audio data from which a graph is generated, where each of the set of samples is generated as a representative sample of the entire data set by using a high, low, first and last data value from each of multiple subsets of the audio data. U.S. Pat. No. 5,371,842 describes a technique for reducing the data flow rate from which a graph will be generated in the context of digitized measurement data. In this patent, the objective is to reduce the rate of a continuous stream of digital from a first bandwidth that cannot be plotted in real time to a second bandwidth that can be plotted in real time.

U.S. Pat. No. 6,057,839 describes a visualization tool for graphically displaying trace data produced by a parallel processing computer system. The object of the invention is to create a visualization tool that allows a user to easily digest statistical trace information from a large number of parallel processing computers at the same time. This is preferably done by creating multiple strip traces and an average utilization trace strip that are graphically displayed on the same screen. The trace data used to generate these traces strips is retrieved from data stored in trace files in time sequential order, one datum at a time using conventional logic for trace retrieval.

Although existing protocol analyzers for computer networks can provide valuable information about performance and problems on such networks, the advent of higher speed computer networks has presented a problem in making trace information captured by a protocol analyzer available on a near real time basis due to the massive amounts of trace data that may be involved in analyzing a problem. Accordingly, it would be desirable to provide a solution to this problem that did not involve restricting the amount of trace data that could be obtained or significantly increasing the cost or complexity of the protocol analyzer.

SUMMARY OF THE INVENTION

The present invention is an indexing system that provides a more efficient and effective interface to display and manipulate large amounts of trace data from computer data and storage networks that is captured and stored in the trace memory of a protocol analyzer. An index of the trace data in the trace memory is generated by reading a selected granularity percentage of the trace data in the trace memory. A host processor connected to the protocol analyzer generates at least two graphic representations on a computer display device of the trace data in response to and based on the index. A first graphic representation is generated by setting the selected granularity percentage at a first percentage and a second graphic representation similar to the first graphic representation is generated while the first graphic representation is being displayed by setting the selected percentage at a second percentage that is greater than the first percentage to regenerate the index. In this way, the first graphic representation is generated in near real time and the second graphic representation is generated at a later time and improves the granularity of the second graphic representation as compared to the first graphic representation. Preferably, the graphic representation is a histogram representative of activity levels within the trace data.

A method and computer-readable storage medium containing programming instructions for generating graphical representations of large volumes of trace data captured from a computer network using a protocol analyzer operably connected to the computer network is also disclosed. The method includes the steps of generating a first index of the trace data by accessing only a first granularity percentage of the trace data. A graphic representation is then displayed on a computer display device of the trace data in response to and based on the first index. While the graphic representation is being displayed, at least a second index of the trace data is generated by accessing a second granularity percentage of the trace data, where the second percentage is greater than the first percentage. Once the second index is completed, the graphic representation of the trace data on the computer display device is updated in response to and based on the second index.

Preferably, each index is generated using a hardware search engine and software executing on the protocol analyzer that calculates an estimated page location in the trace memory based on the selected percentage and requests the hardware search engine to return a next data value from the trace memory in response to the estimated page location. In the case where the computer network is a storage channel network and the trace data comprises frames of packetized data having a header portion and a data portion, the first and second index are generated by analyzing the header portion to determine an activity associated with the frame.

In the preferred embodiment for use with a Fibre Channel network, a histogram representative of levels of activity in the frames of trace data used to create the first and second index is displayed to a user. Preferably, a user can selectively identify frame data to be displayed on the computer display device by using a pointing device to identify locations within the histogram that are of interest. In this embodiment, the trace memory is at least 100 Mbytes of storage. The first histogram is generated in near real time or less than about two seconds from a completion of storing the trace data in the trace memory. The first histogram is based on a coarse index in which the first percentage is less than about 5% and the second histogram is based on a fine index in which the second percentage is greater than the first percentage and less than or equal to 100%. Preferably, the system further includes at least a third percentage used to generate a rough index and an associated third histogram in which the third percentage is greater than the first percentage and less than the second percentage. Preferably, the first percentage is less than about 2.5%, the second percentage is greater than about 25% and the third percentage is greater than about 5% and less than about 25%. Additional passes to generate additional levels of index granularity may also be added and the fine index for the second percentage does not need to be created at a 100% granularity level.

The preferred embodiment affords significant improvement in the amount of time required to generate histograms for trace data from a Fibre Channel computer network. In the case of a full two channel trace of 512 Mbytes per channel worth of trace data, a coarse histogram at a 1% granularity level can be generated by the present invention in about 1 second, as compared to the nearly 1 minute required for the same protocol analyzer and host processor to generate a histogram based on analysis of 100% of the trace data for each channel trace. In the context where the histogram is used as a mechanism to identify portions of the trace data for further review, this time savings allows the user to begin identifying and accessing desired trace data almost immediately, instead of having to wait for a minute or more to even begin looking at the trace data. The further refinements in granularity of the histogram that are provided by the rough index and fine index are filled in as available to increase the resolution at which the user can view the histogram; however, the critical ability of the user to begin utilizing the histogram to identify and access trace data does not need to wait for these more detailed indexes to be completed. Thus, a user can view a graphic representation of the complete trace and begin to identify and access trace data of interest in near real time almost immediately upon completion of the trace.

DETAILED DESCRIPTION OF THE PREFERRED EMBODIMENT

Figure 3:
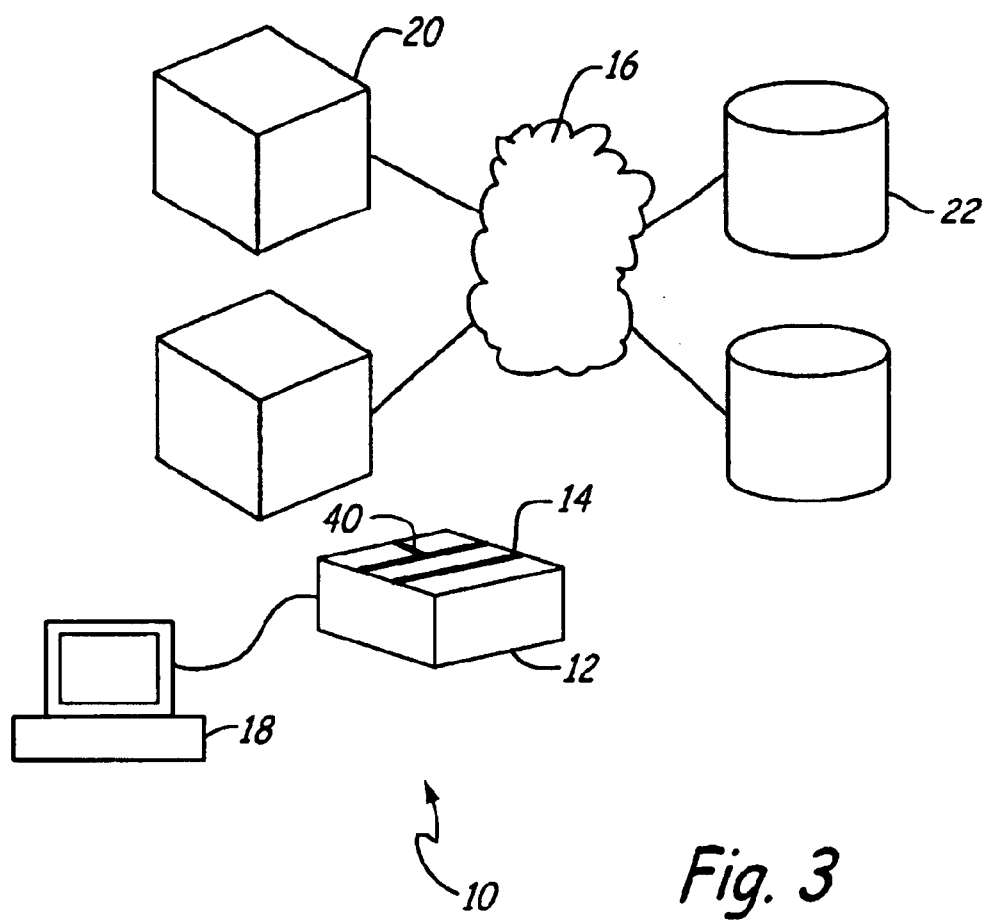
FIG. 3 is an overall block diagram of a preferred embodiment of the present invention.

Referring to FIG. 3, an overall block diagram of a preferred embodiment of the present invention will be described. The indexing system 10 includes a protocol analyzer 12 having a trace memory 14 that is operably connected to a computer network 16. A host processor 18 is operably connected to the protocol analyzer 12 to control the setup of the protocol analyzer and to display results and trace data generated by the protocol analyzer 12 and stored in trace memory 14. Although it is preferable to have the host processor 18 operate remote from the protocol analyzer 12 as shown in FIG. 3, it should be understood that the host processor 18 could be packaged together with the protocol analyzer, or, less preferably, that the functions of both the host processor 18 and protocol analyzer could be performed by a common processor or set of processors. For a more detailed explanation of the configuration and operation of the preferred embodiment of the protocol analyzer 12, reference is made to the previously-identified application entitled Integrated Multi-Channel Fiber Channel Analyzer, the disclosure of which is hereby incorporated by reference.

In the preferred embodiment, the computer network 16 is a storage channel network and the trace data comprises frames of packetized data having a header portion and a data portion. The a protocol analyzer 12 analyzes the header portion to determine an activity associated with the frame. Examples of serial communication interfaces for such storage channel networks include Fibre Channel, Gigabit Ethernet, SCSI and Infininet. Storage channel networks typically are used to communicate between computer processors 20 and their associated disk drive or similar mass storage subsystems 22, although more recently storage channel networks have been extended to operate in storage attached networks (SANs) in which multiple computer processors have access to multiple disk drive subsystems. Alternatively, the computer network may be a computer data network and the trace data will comprise frames of packetized data having a header portion and a data portion. Examples of communication interfaces for such computer data communication networks include Ethernet, Gigabit Ethernet, ATM/OC3, FDDI and TCP/IP. Computer data networks typically are used for communications between computer processors, although more recently computer data networks have also been adapted to communicate among computer processors and mass storage devices as part of a network attached storage (NAS) arrangement. In both a storage channel network and a computer data network, the size of the data portion transferred in each packet or frame is generally at least an order of magnitude greater than the size of the header portion.

Figure 1:
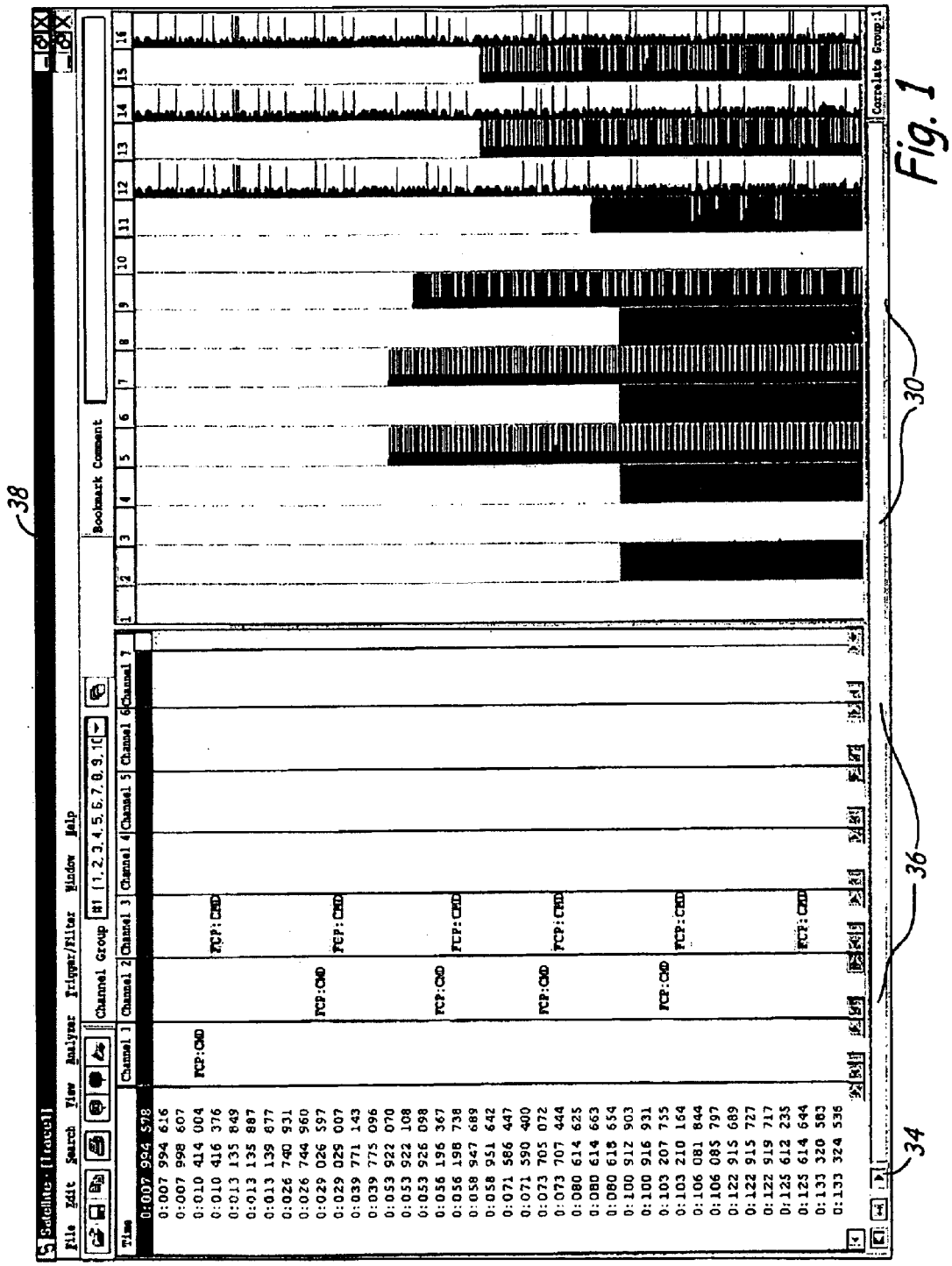
FIG. 1 is a screen capture of a first histogram generated from a rough index representing a sampling of about 10 percent of the trace data records.

The detailed operation of the preferred embodiment of the index system 10 can be understood with reference to the source code listings attached to the previously-referenced provisional patent application reference which is hereby incorporated by reference. In a preferred embodiment, three table indexes are utilized in the generation of the final histogram a shown in FIG. 2. A first course table index representing a 1 percent sample of all of the trace data records obtained for a given trace is generated. This takes typically approximately 1 second to create. A second rough table index as shown in FIG. 1 represents a 10 percent sample of all trace data records obtained for the given trace. This process typically takes about 15 seconds to create. A third fine table index represents 100 percent of the trace data records contained in each page. This process can take up to 20 seconds for each full channel of data being capture depending upon the depth of the trace. Each of these table indexes is used to generate a histogram in real-time that is displayed by the user interface program. The histogram is updated to reflect a further refinement and increased resolution of the histogram upon the completion of the generation of each of the associated index tables.

Figure 2:
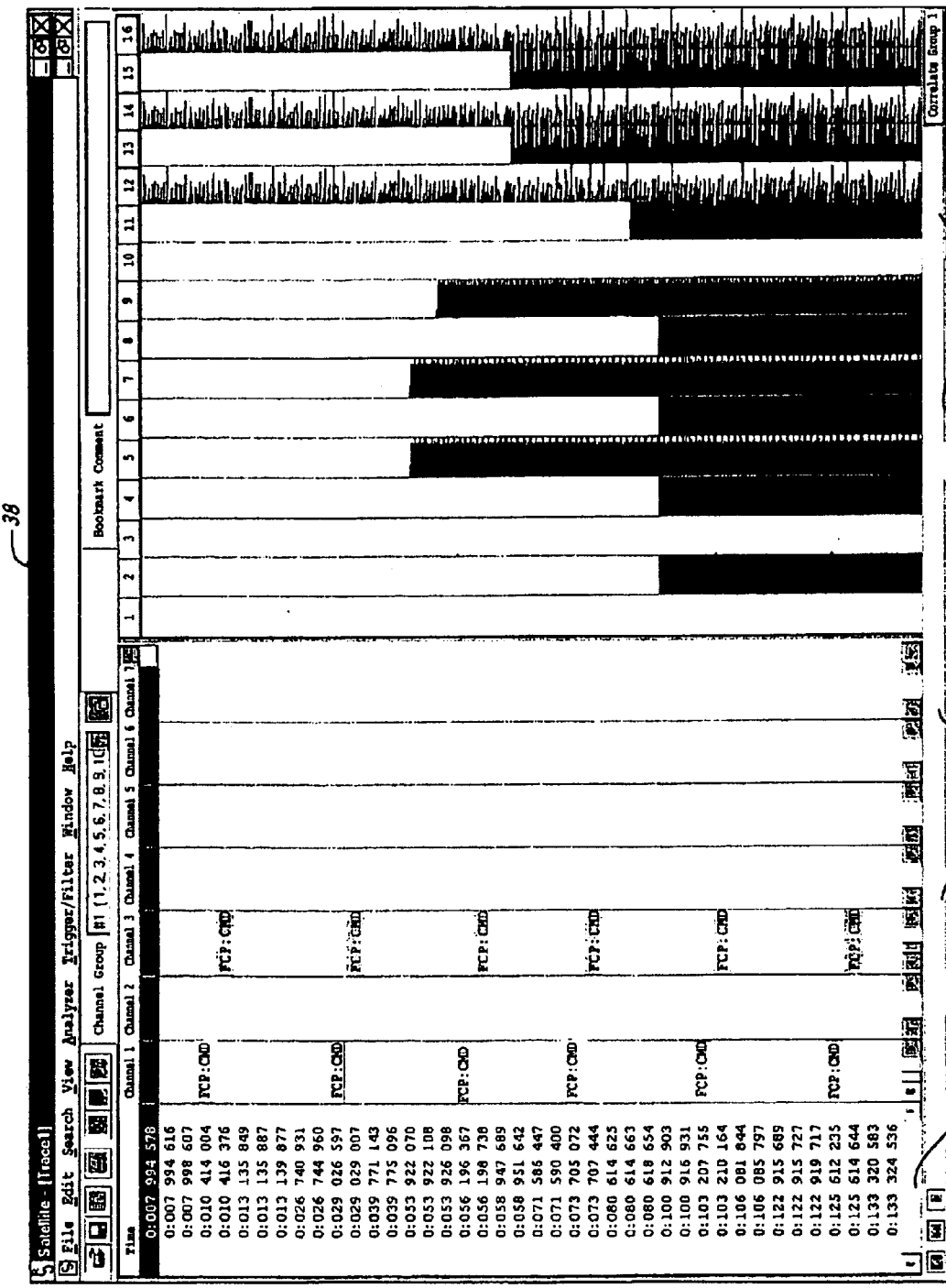
FIG. 2 is a screen capture the second histogram generated from a fine index representing 100 percent of the trace data records sampled in FIG. 1.

The table index of the trace data in the trace memory 14 is generated by reading a selected granularity percentage of the trace data in the trace memory 14. The host processor 18 connected to the protocol analyzer 12 generates at least two graphic representations on a computer display device of the trace data in response to and based on the index. A first graphic representation as shown at 30 in FIG. 1 is generated by setting the selected granularity percentage at a first percentage. A second graphic representation as shown at 32 in FIG. 2 is similar to the first graphic representation 30 and is generated while the first graphic representation 30 is being displayed. The second graphic representation 30 is generated by setting the selected percentage at a second percentage that is greater than the first percentage in order to regenerate the index as a finer level of granularity. In this way, the first graphic representation is generated in near real time and the second graphic representation is generated at a later time and improves the granularity of the second graphic representation 32 as compared to the first graphic representation 30.

Preferably, the graphic representations 30, 32 are histograms representative of activity levels within the trace data as shown in FIGS. 1 and 2. The preferred embodiment of the user interface for the host processor 18 allows for simultaneous display of multiple channels worth of trace data, as well a providing for display of common time stamp information 34 for all channels and channel command values 36 for each channel. A tool bar 38 at the top of the window display allows a user to customize the display. A user can selectively identify detailed trace data to be displayed on the computer display device at areas 34 and 36 by using a pointing device to identify locations within the histograms 30, 32 that are of interest. Instead of having to wait until a complete histogram is completed, however, the user can start this process almost immediately beginning with the display of the first graphic representation 30. Preferably, the detailed trace data displays all of the data frames with time stamp values surrounding the point of interest. Alternatively, additional information other than that displayed in areas 34 and 36 could also be displayed in response to the user identifying an area of interest on the histograms 30, 32.

One of the advantages of the preferred embodiment is that it utilizes an atomic lockout feature during the generation of each of the index tables so as to allow a user to access the data at the same time that the tables and histogram are actually being displayed. In a preferred embodiment, a time stamp pops up as a user moves a pointing device over a location on histogram and the user can then go directly to that particular data record indicator by the time stamp by double-clicking, for example with the pointing device.

Preferably, each index is generated using a hardware search engine 40 and software executing on the protocol analyzer 12 that calculates an estimated page location in the trace memory 14 based on the selected percentage and requests the hardware search engine 40 to return a next data value from the trace memory 14 in response to the estimated page location. In the case where the computer network 16 is a storage channel network and the trace data comprises frames of packetized data having a header portion and a data portion, the first and second index are generated by analyzing the header portion to determine an activity associated with the frame. The particular selection of sample size and page size can be optimized for a given application. Each sample represents a search through the trace data records for a time stamp record at a location consistent with the size of the sample being taken. Preferably, a hardware search engine of the type described in the previously-identified application entitled Deep Trace Memory System For A Protocol Analyzer is utilized to increase the efficiency of the search process. In a preferred embodiment, each data frame is a four byte fiber channel word that is stored as a record in a page size which is preferably 4096 records. The index tables included in addition to a time stamp for each of the sampled entries, a representation of where the data is stored (i.e., disk, in buffer, in a remote location), and the record number of the entry. The index tables thus create a map that can be used to access and analyze the data frames for each entry. This analysis can be one by either or both of the protocol analyzer 12 or the host processor 16. Where record numbers are stored as part of the index, it is assumed that subsequent random access directly to each record number is possible and efficient, by, for example, using the hardware search engine 40 to quickly retrieve a single or small group of data frames associated with a given record number.

In the preferred embodiment, indexing code on the protocol analyzer 12 uses the hardware engine 40 to look for the first timestamp of every page (4K block of data) beginning with the start of the trace. When a timestamp is found, it is reported from the protocol analyzer 12 to the host processor 16 as two words worth of index information, with a corresponding record number that is transferred into a timestamp format for building the index table. Preferably, five time stamp structures are sent at one time. If no time stamp is found in a page, then no entry is added to the index table for that page. When an index instance is created and its "run" function is called, the run function claims ownership of the communication channel between the protocol analyzer 12 and the hardware search engine 40, starts a hardware search and then returns control. On the next "run" call, the hardware search engine 40 is checked. If a timestamp has been found, its location is verified with a mode0 read and its value is recorded in an index structure that will be sent to the host 24 processor 16. For the last timestamp in an index, a mode0 search is used to verify the last timestamp in the trace because the last two words of data in a trace should always be timestamps. Preferably, other uses of the hardware search engine such as paging and searching are given higher priority than the indexing function.

Although the preferred embodiment is described in terms of use of a hardware search engine 40, it is also possible to utilize the present invention for access a trace memory 14 without a hardware search engine 40. In this case, the host processor 16, for example, could calculate the anticipated page offset and issue a read request directly to the trace memory for a given quantity of data. Once read, that data could be analyzed to generate the index inside the host processor 16, rather than generating and storing the index within the protocol analyzer 12 as is done in the preferred embodiment. In addition to the index, time stamp and location information, it is also possible to add information to the index at the time it is built based on analysis of the header information of data at the next time stamp value returned by the hardware search engine 40. It also will be recognized that numerous other techniques for reading or accessing the data in the trace memory and building or generating the index tables can be used. The indexes can be built by using software, hardware or any combination of software and hardware. The indexes can represent actual data values from the trace data, interpreted values from the trace data or even statistics generated from the trace data, or any combination. For example, a common control routine could be used to sets the selected percentage at a first percentage to initially generate the graphic representation by calling an indexing subroutine following by a display subroutine. The common control routine can then set the selected percentage at a second percentage that is greater than the first percentage and repeat the process any number of additional times. The graphic representation from the previous index is displayed while the index for the next finer level of granularity is produced. The number and size of the granularity levels may vary based on desired response time and response detail required.

In the preferred embodiment for use with a Fibre Channel network, histograms 30, 32 are representative of levels of activity in the frames of trace data used to create the first and second index is displayed to a user. Other graphical representations of information such a bar chart, pie charts, scattergrams, and graphs in two or three dimensions could also be used, depending upon the particular application.

In the preferred embodiment, the trace memory 14 includes at least 100 Mbytes of storage. The first histogram is generated in near real time or less than about two seconds from a completion of storing the trace data in the trace memory. The first histogram is based on a coarse index in which the first percentage that is preferably less than about 5%. The second histogram is based on a fine index in which the second percentage is greater than the first percentage and less than or equal to 100%. Preferably, the system further includes at least a third percentage used to generate a rough index and an associated third histogram in which the third percentage is greater than the first percentage and less than the second percentage. Preferably, the first percentage is less than about 2.5%, the second percentage is greater than about 25% and the third percentage is greater than about 5% and less than about 25%. Additional passes to generate additional levels of index granularity may also be added and the fine index for the second percentage does not need to be created at a 100% granularity level.

Figure 4:
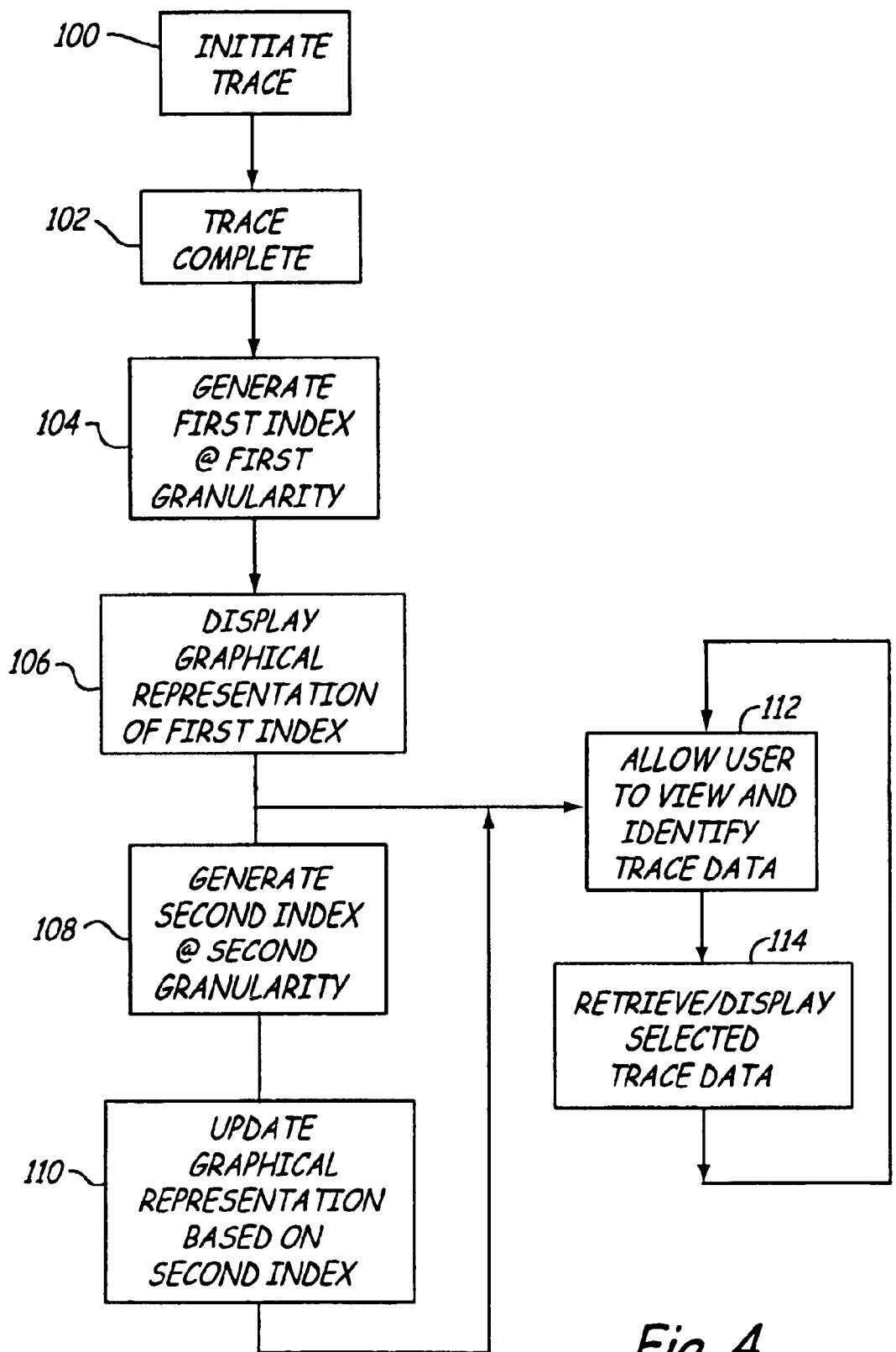
FIG. 4 is a flow chart of a preferred embodiment of the present invention.

A method and computer-readable storage medium containing programming instructions for generating graphical representations of large volumes of trace data captured from a computer network using a protocol analyzer operably connected to the computer network is shown in FIG. 4. At step 100, a trace is initiated and at step 102, the trace is complete and the trace data is stored in the trace memory of a protocol analyzer. At step 104, a first index of the trace data is generated by accessing only a first granularity percentage of the trace data. At step 106, a graphic representation is then displayed on a computer display device of the trace data in response to and based on the first index. While the graphic representation is being displayed, at least a second index of the trace data is generated at step 108 by accessing a second granularity percentage of the trace data, where the second percentage is greater than the first percentage. Once the second index is completed, the graphic representation of the trace data on the computer display device is updated at step 110 in response to and based on the second index. At any point after step 106, a user is allowed to identify detailed trace data at step 112. The identified data is then displayed at step 114. To insure that a user has appropriate access to the data at all times, the replacement of the second index for the first index which occurs as part of step 110 is done with the assistance of an atomic lock protocol.

A portion of the disclosure of this invention is subject to copyright protection. The copyright owner permits the facsimile reproduction of the disclosure of this invention as it appears in the Patent and Trademark Office files or records, but otherwise reserves all copyright rights.

What is claimed is:

1. An indexing system for generating graphical representations of large volumes of trace data captured from a computer network comprising:

a protocol analyzer operably connected to the computer network and having a trace memory in which trace data comprising data entries representing selected portions of actual data communications from the computer network is stored;

means for generating an index of a selected granularity percentage of the trace data in the trace memory by reading the selected granularity percentage of the trace data in the trace memory and creating a map to individual data entries in the selected granularity percentage of the trace data that includes at least a representation of where each of those data entries is stored in the trace memory; and a host processor operably connected to the protocol analyzer and the means for generating the index and having a computer display device and software executing on the host processor that generates at least two graphic representations on the computer display device of the trace data in response to and based on the index, including a first graphic representation generated by setting the selected granularity percentage at a first percentage and a second graphic representation similar to the first graphic representation generated while the first graphic representation is being displayed by setting the selected percentage at a second percentage that is greater than the fist percentage to regenerate the index, such that the first graphic representation is generated in near real time and the second graphic representation is generated at a later time and improves the granularity of the second graphic representation as compared to the first graphic representation.

2. The system of claim 1 wherein the graphic representation is a histogram representative of activity levels within the trace data and a user can selectively identify trace data to be displayed on the computer display device by using a pointing device to identify locations within the histogram that are of interest beginning with the display of the first graphic representation.

3. The system of claim 1 wherein the means for generating the index comprises a hardware search engine and software executing on the protocol analyzer that calculates an estimated page location in the trace memory based on the selected percentage and requests the hardware search engine to return a next data from the trace memory in response to the estimated page location.

4. The system of claim 1 wherein the computer network is a storage channel network and the trace data comprises frames of packetized data having a header portion and a data portion and the protocol analyzer analyzes the header portion to determine an activity associated with the frame.

5. The system of claim 4 wherein the graphic representation is a histogram representative of levels of activity in the frames of trace data used to create the index and a user selectively identifies frame data to be displayed on the computer display device by using a pointing device to identify locations within the histogram that are of interest.

6. The system of claim 4 wherein the storage channel network uses a Fibre Channel communication interface protocol.

7. The system of claim 1 wherein the trace memory comprises at least 100 Mbytes of storage and the first graphic representation is generated in less than about two seconds from a completion of staring the trace data in the race memory.

8. The system of claim 1 wherein the first graphic representation is based on a coarse index in which the first percentage is less than about 5% and the second graphic representation is based on a fine index in which the second percentage is greater than the first percentage and less than or equal to 100%.

9. The system of claim 8 wherein the system further comprises at least a third percentage used by the host processor to generate a rough index in which the third percentage is greater than the first percentage and less than the second percentage.

10. The system of claim 9 wherein the first percentage is less than about 2.5%, the second percentage is greater than about 25% and the third percentage is greater than about 5% and less than about 25%.

11. A method of generating graphical representations of large volumes of trace data comprising data entries representing selected portions of actual data communications captured from a computer network using a protocol analyzer operably connected to the computer network comprising:

generating a first index of the trace data by accessing only a first granularity percentage of the trace data and creating an index map to individual data entries in the first granularity percentage of the trace data that includes at least a representation of where each of those data entries is stored;

displaying a graphic representation on a computer display device of the trace data in response to and based on the first index;

while the graphic representation is being displayed, generating at least a second index of the trace data by accessing a second granularity percentage of the trace data, where the second percentage is greater than the first percentage and updating the index map to include at least a representation of where each of those data entries with the second granularity percentage is stored; and updating the graphic representation of the trace data on the computer display device in response to and based on the second index.

12. The method of claim 11 wherein the graphic representation is a histogram representative of activity levels within the trace data and wherein the method further comprise the step of allowing a user to selectively identify trace data to be displayed on the computer display device by using a pointing device to identify locations within the histogram that are of interest beginning with the display of the graphic representation based on the first index.

13. The method of claim 11 wherein the steps of generating the first and second index are accomplished by using hardware search engine and software that calculates an estimated page location in the trace memory based on the selected percentage and requests the hardware search engine to return a next data entry from the trace memory in response to the estimated page location.

14. The method of claim 11 wherein the computer network is a storage channel network and the trace data comprises frames of packetized data having a header portion and a data portion and wherein the steps of generating the first and second index analyze the header portion to determine an activity associated with the frame.

15. The method of claim 14 wherein the steps of displaying and updated the graphic representation create a histogram representative of levels of activity in the frames of trace data used to create the first and second index.

16. The method of claim 14 wherein the storage channel network uses a Fibre Channel communication interface protocol and wherein the trace memory comprises at least 100 Mbytes of storage and the step of displaying the first graphic representation is accomplished in less than about two seconds from a completion of storing the trace data in the trace memory.

17. The method of claim 11 wherein the first graphic representation is based on a coarse index in which the first percentage is less than about 5% and the second graphic representation is based on a fine index in which the second percentage is greater than the first percentage and less than or equal to 100%.

18. The method of claim 17 wherein the system further comprises at least a third percentage used by the host processor to generate a rough index in which the third percentage is greater than the first percentage and less than the second percentage.

19. The method of claim 18 wherein the first percentage is less than about 2.5%, the second percentage is greater than about 25% and the third percentage is greater than about 5% and less than about 25%.

20. A computer-readable storage medium accessible to a host processor having a computer display device and operably connected to a protocol analyzer that is operably connected to a computer network, the protocol analyzer including a trace memory in which actual trace data from the computer network is stored, the storage medium storing programming instructions for at least one of the host processor and the protocol analyzer comprising:

programming instructions for generating a first index of the trace data by accessing only a first granularity percentage of the trace data and creating an index map to individual data entries in the first granularity percentage of the trace data that includes at least a representation of where each of those data entries is stored in the trace memory;

programming instructions for displaying a graphic representation on the computer display device of the trace data in response to and based on the first index;

programming instructions for generating at least a second index of the trace data by accessing a second granularity percentage of the trace data while the graphic representation is being displayed and updating the index map to include at least a representation of where each of those data entries associated with the second granularity percentage is stored in the trace memory, where the second percentage is greater than the first percentage; and programming instructions for updating the graphic representation of the trace data on the computer display device in response to and based on the second index.

* * * * *